United States Patent [19]

Kang et al.

[11] Patent Number: 5,574,239

[45] Date of Patent: Nov. 12, 1996

[54] VIDEO-SONG ACCOMPANIMENT APPARATUS AND METHOD FOR DISPLAYING RESERVED SONG

[75] Inventors: Jae-yong Kang; Hong-soon Park, both of Suwon, Rep. of Korea

[73] Assignee: Samsung Electronics Co., Ltd., Kyungki-Do, Rep. of Korea

[21] Appl. No.: 456,721

[22] Filed: Jun. 1, 1995

[30] Foreign Application Priority Data

Jun. 22, 1994 [KR] Rep. of Korea ............... 94-14324

[51] Int. Cl.$^6$ .............. G09B 5/00; G10H 1/36; H04N 5/76

[52] U.S. Cl. ............... 84/610; 84/639; 84/645; 84/477 R; 434/307 A; 386/97; 386/125

[58] Field of Search ............ 84/601, 602, 609–614, 84/639, 640, 645; 358/335, 342; 434/307 A; 369/4

[56] References Cited

U.S. PATENT DOCUMENTS 5,131,311  7/1992  Murakami et al. ............... 84/609
5,218,580  6/1993  Okamura et al. ............... 369/4 X
5,494,443  2/1996  Nakai et al. ............... 434/307 A

*Primary Examiner*—Stanley J. Witkowski
*Attorney, Agent, or Firm*—Sughrue, Mion, Zinn, Macpeak & Seas

[57] ABSTRACT

A method of displaying a title and lyrics of the first measure of a reserved song before the end of a currently performed song includes steps for calculating remaining time by comparing total performance time with an elapsed time of a currently performed song, obtaining a title and lyrics information for the first measure of the reserved song responsive to a reserved song number when the remaining time is less than a predetermined value, and displaying the title and the lyrics information superimposed on a background image associated with the currently performed song. The method for displaying title and lyrics information using a video-song accompaniment apparatus enhances user convenience by displaying the title and associated lyrics for the first measure of a reserved song for verification before a currently performed song ends. A video-song accompaniment apparatus capable of performing this method is also described.

5 Claims, 2 Drawing Sheets

VIDEO-SONG ACCOMPANIMENT APPARATUS AND METHOD FOR DISPLAYING RESERVED SONG

BACKGROUND OF THE INVENTION

1. Field of the Invention

The present invention relates to a video-song accompaniment apparatus and, more particularly, to a video-song accompaniment apparatus having a reservation function permitting display of title and associated lyrics of the first measure of a reserved song before a currently performed song ends. A corresponding operating method is also disclosed.

The instant application is based on Korean Patent Application No. 94-14324, which is incorporated herein by reference for all purposes.

2. Brief Discussion of Related Art

A video-song accompaniment apparatus, commonly called a karaoke machine, displays lyrics on a video display device according to an accompaniment signal, enabling a user viewing the displayed lyrics to sing the displayed song in time to the accompaniment signal.

The reservation function of a video-song accompaniment apparatus permits reservation of a song which is going to be performed next. A reservation function is useful when many persons use a single apparatus.

When using the reservation function, a user first selects a number of a desired song by referring to printed matter on which a title, a song number, etc., are written. Then, the user inputs the song number for reservation using a reservation key. The video-song accompaniment apparatus stores the song numbers input by reservation and, after a currently performed song ends, reproduces the reserved songs in order of reservation input. A video-song accompaniment apparatus may display the number of a reserved song through a segment display device or by using subtitle information on a screen.

However, although the song number is displayed using the segment display device or is displayed onto a background image, it is difficult for a user to equate the song number with the desired song. That is, a user cannot easily associate the song's title or the lyrics of the first measure of a selected song, with the song number, which is arbitrarily designated by an apparatus supplier.

SUMMARY OF THE INVENTION

The present invention was motivated by a desire to solve the above-described problem.

An object of the present invention is to provide a method for displaying a reserved song, by which a title and lyrics of the first measure of a song to be sequentially performed, can be displayed on a display device before a currently performed song ends.

Another object of the present invention is to provide a video-song accompaniment apparatus operating according to the method for displaying a reserved song.

These and other objects, features and advantages according to the present invention are achieved by a method for displaying a reserved song. In an exemplary case, the method includes steps for calculating the remaining time by checking total performance time and an elapsed time of a currently performed song, obtaining respective title and lyrics information of a first measure of a reserved song by referring to a reserved song number, when the remaining time is less than a predetermined value, and displaying the title and the lyrics information for the first measure of the reserved song overlapped onto the background image associated with the currently performed song.

These and other objects, features and advantages according to the present invention are achieved by a video-song accompaniment apparatus, which includes a reproducing device for reproducing lyrics information and accompaniment information from a recording medium, a first lyrics memory in which a lyrics information of a song read out from the reproducing portion is stored, a second lyrics memory in which a title and lyrics information of the first measure of a reserved song read out from the reproducing portion are stored, an accompaniment information memory in which accompaniment information of the song, read out from said reproducing portion, is stored, a lyrics signal generator for receiving the lyrics information read out from the first and second lyrics memories, respectively, and generating a video signal corresponding to the lyrics information, an accompaniment signal generator for receiving the accompaniment information read out from the accompaniment information memory and generating an audio signal corresponding to the accompaniment information, a remaining performance time operating portion for calculating total performance time, elapsed performance time, and remaining performance time, by referring to the quantity of the accompaniment information stored in the accompaniment information memory and the quantity of the accompaniment information performed already, and a controller for reading out the lyrics information stored of the first lyrics memory and providing the information to the lyrics signal generator, and if the remaining performance time calculated by the remaining performance time operating portion is less than a predetermined value, reading out the title and lyrics information of the song stored in the second memory and providing the title and lyrics information to the lyrics signal generator.

BRIEF DESCRIPTION OF THE DRAWINGS

The above objects of the present invention will become more apparent by describing in detail a preferred embodiment thereof with reference to the attached drawings in which.

DETAILED DESCRIPTION OF THE PREFERRED EMBODIMENTS

Figure 1:
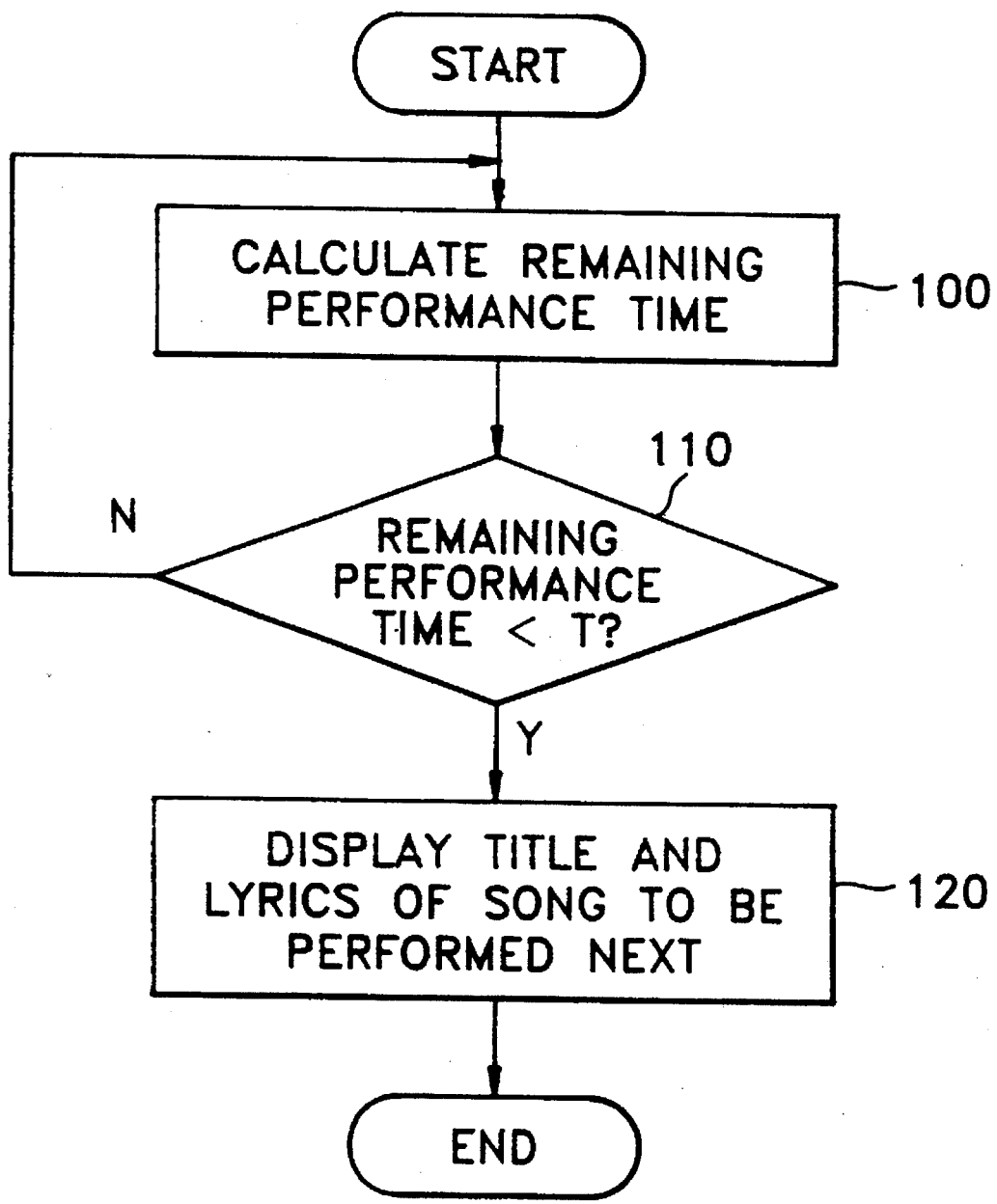
FIG. 1 is a flowchart illustrating a method of displaying a reserved song according to the present invention.

FIG. 1 is a flowchart illustrating a method of displaying a reserved song according to the present invention.

First, in step 100, remaining performance time is calculated by referring to total performance time and elapsed time of a currently performed song. In the case of a compact disk, the total performance time of a song is easily determined by referring to the table of contents (TOC) in a lead-in area. When data in the so-called musical instrument digital interface (MIDI) format is used as accompaniment information, the total performance time is calculated by analyzing a real-time message located among the MIDI data.

In step 110, it is checked whether the total performance time calculated in step 100 is less than a predetermined value (T). If the remaining performance time is greater than the predetermined value, step 100 is repeated. When the remaining performance time is less than the predetermined value, a title and associated lyrics of the first measure are obtained from the lyrics information of a song having priority order, by referring a reserved song list, during step 120. Subsequently, the title and lyrics are displayed on a video display device (not shown).

Preferably, in order to prevent overlap between the lyrics information of a currently performed song and a subsequent song, the lyrics information of a reserved song must be displayed on the area where the lyrics information of the currently performed song is not displayed. It will be appreciated that display technology for displaying certain information on a particular area of a screen is self-evident to one of ordinary skill in the display field.

According to the process illustrated in the flow chart of FIG. 1, before a currently performed song ends, the title and the lyrics of the first measure of a following reserved song are displayed, which permits the user time to prepare for singing the reserved song.

Figure 2:
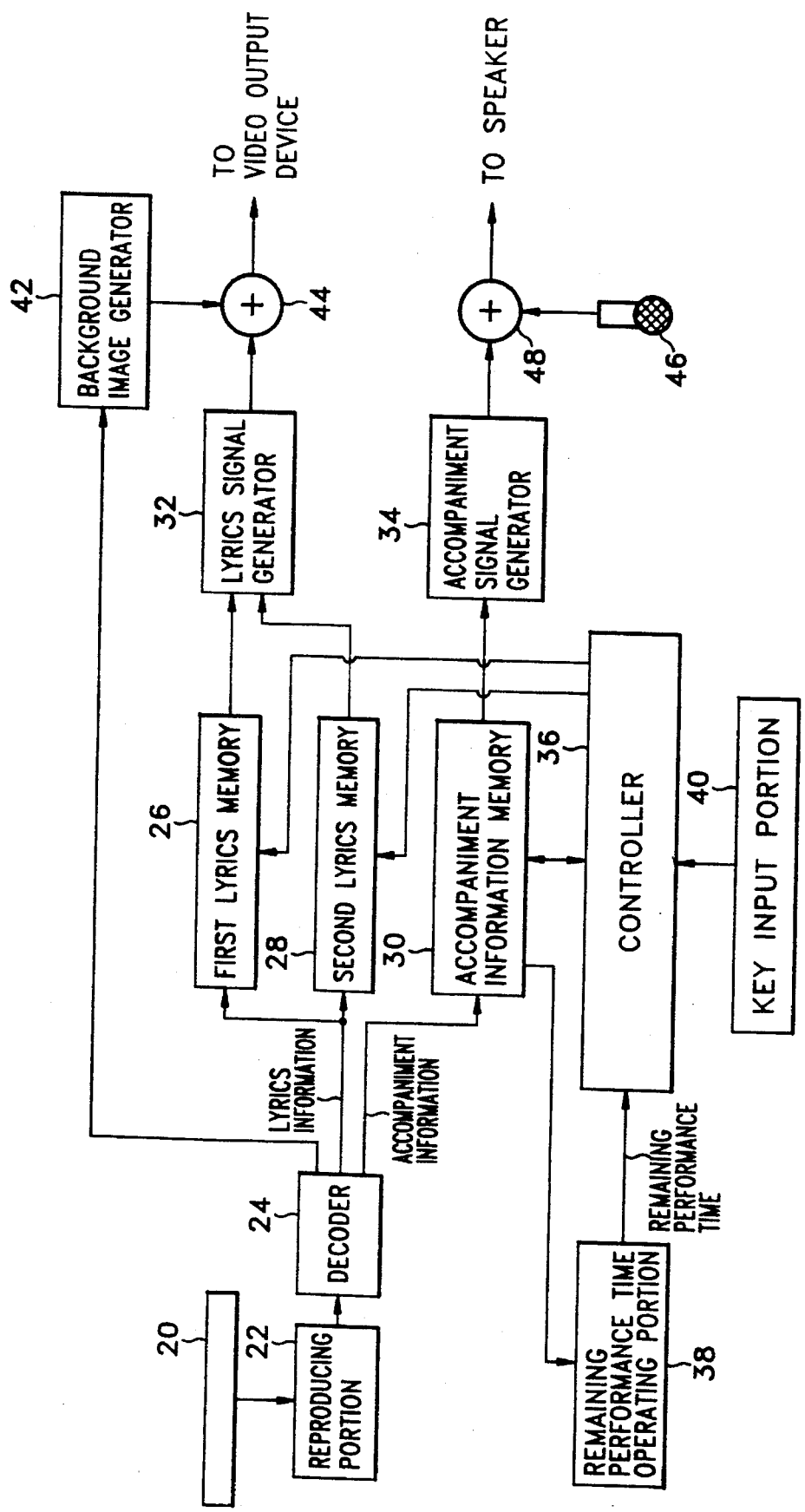
FIG. 2 is a block diagram illustrating an video-song accompaniment apparatus according to the present invention.

FIG. 2 is a block diagram showing a preferred embodiment of a video-song accompaniment apparatus according to the present invention. As shown in FIG. 2, a recording medium 20, on which accompaniment information and lyrics information are written, is read out by a reproducing portion 22 and then decoded by a decoder 24, which advantageously restores the accompaniment information and lyrics information from the read-out signals input through reproducing portion 22.

Decoder 24 provides decoded information to a first lyrics memory 26, in which lyrics information for a song being performed is stored, a second lyrics memory 28, in which lyrics information of a song to be performed next is stored, and an accompaniment information memory 30, in which accompaniment information is stored.

Advantageously, a lyrics signal generator 32 for generating lyrics signals receives respective lyrics information read out from memories 26 and 28, and provides the lyrics signals to a video output device (not shown) via a video mixer 44. From FIG. 2, is will be appreciated that decoded information is converted into background signals, which are applied to a second input terminal of mixer 44, by a background image generator 42.

Preferably, an accompaniment signal generator 34 generates accompaniment signals responsive to accompaniment information read out from accompaniment information memory 30, and provides the accompaniment signals to a speaker (not shown) via a mixer 48. The second input to mixer 48 is connected to a microphone 46. It will be appreciated that adder 48 acts as an audio mixer for mixing a vocal signal entered through microphone 46 and the accompaniment signal generated from accompaniment signal generator 34 and providing the mixed result to one or more speakers.

The video-song accompaniment apparatus includes a controller 36 for performing a system control function by reading out lyrics information from memories 26 and 28 and providing the information to lyrics signal generator 32, or by reading out the accompaniment information from accompaniment information memory 30 and providing that information to accompaniment signal generator 34. One input to controller 36 is a remaining performance time operating portion 38, which advantageously calculates total performance time, elapsed performance time, and remaining performance time associated with the song currently being performed. Another input to controller 36 is provided by a key input portion 40, which preferably permits both song selection and reservation to be performed by a user.

In FIG. 2, a video-song accompaniment apparatus displays lyrics information of the first measure of a reserved song stored in second memory 28, which is read out by controller 36, if the value calculated by remaining performance time operation portion 38 is less than a predetermined time. Advantageously, the predetermined time T can be preset according to a user's selection input.

Advantageously, recording medium 20, in which lyrics information or accompaniment information is recorded, may be a compact disk or a semiconductor memory. It will be appreciated that a background still image or moving images may be contained in the recording medium 20.

A compact disk is typically divided into a lead-in area, a program area, and a lead-out area. In the lead-in area, a leading address and information about the total necessary time of contained songs are written. Hence, a compact disk reproducing apparatus obtains information on each song by first referring to the TOC area, immediately after the disk is inserted. Remaining performance time operating portion 38 calculates remaining performance time by subtracting the elapsed performance time from the total performance time of a song currently being reproduced. Controller 36 compares the remaining performance time, calculated by remaining performance time operating portion 38, with the predetermined time. If the calculated value is less than the predetermined time, controller 36 reads out the title and the associated lyrics information of the first measure from the lyrics information of a reserved song stored in second memory 28 and provides the title and the lyrics information to the display device. The accompaniment information may be composed of MIDI data, i.e., a MIDI signal. Table 1 shows an exemplary MIDI signal data format.

TABLE 1

|  |  | STATUS BYTE | NUMBER OF DATA BYTES |
|---|---|---|---|
| CHANNEL MESSAGE | Note OFF | 8X | 2 |
|  | Note ON | 9X | 2 |
|  | Poly Phonic Key Pressure | AX | 2 |
|  | Control Change | BX | 2 |
|  | Program Pressure | Cx | 1 |
|  | Channel Pressure | DX | 1 |
|  | Pitch Foil Change | EX | 2 |
| SYSTEM MESSAGE | Exclusive Change | F0 | arbitrary |
|  | Cutter Frame Change | F1 | 1 |
|  | Song Position Pointer | F2 | 2 |
|  | Song Selector | F3 | 1 |
|  | Tune Request | F6 | nonexistent |
|  | End of Exclusive | F7 | nonexistent |
|  | Timing Clock | F8 | nonexistent |
|  | Start | FA | nonexistent |
|  | Continue | FB | nonexistent |
|  | Stop | FC | nonexistent |
|  | Active Sensing | FE | nonexistent |
|  | System Reset | FF | nonexistent |

The MIDI signal includes a "status byte", which, in an exemplary case, is one byte long and a respective "data byte", which, in the exemplary case under discussion, is more than one byte long. The MIDI signal is largely divided into a channel message and a system message in accordance with the status byte. The channel message is divided into a voice message and a mode message, while the system message is divided into an exclusive message, a common message, and a real-time message.

The total performance time of accompaniment signals among MIDI data is calculated by the start and stop messages among the system messages. The elapsed performance time is calculated by accumulating the performance time, and the remaining performance time is acquired by subtracting the elapsed time from the total performance time.

Lyrics signal generator 32 controls the display of the title and the lyrics information of the first measure read out from second lyrics memory 28, taking care not to overlap this information with the lyrics information of a currently performed song. For example, a title and lyrics information of the first measure of a reserved song can be displayed on the area where lyrics information of a currently performed song is not displayed, or displayed during the time during which an intermezzo is played. Such technology is self-evident for one skilled in the field of displaying character information through a display device.

As described above, the video-song accompaniment apparatus according to the present invention is convenient to use, since it provides means for displaying title and respective lyrics of the first measure of a reserved song for verification immediately before a currently performed song ends.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of displaying a reserved song in a video-song accompaniment apparatus having a reservation function, said method comprising the steps of:

calculating remaining time by comparing total performance time with an elapsed time of a currently performed song;

obtaining a title and lyrics information for a first measure of the reserved song responsive to a reserved song number, when said remaining time is less than a predetermined value; and displaying the title and the lyrics information for the first measure of the reserved song superimposed on a background image of a respective currently performed song.

2. A method of displaying a reserved song for a video-song accompaniment apparatus having a reservation function, and having a reproducing portion recovering lyrics information and accompaniment information from a recording medium, a first lyrics memory storing first lyrics information associated with a currently performed song and a second lyrics memory storing a title and second lyrics information representing a first measure of a reserved song which is to be performed next, an accompaniment information memory storing the accompaniment information for the currently performed song, a lyrics signal generator receiving the respective lyrics information from said first and said second lyrics memories and generating a video signal corresponding to the respective lyrics information, an accompaniment signal generator receiving the accompaniment information and generating an audio signal corresponding to the accompaniment information, a remaining performance time operating portion calculating total performance time, elapsed performance time, and remaining performance time responsive to the accompaniment information, and a controller controlling read out of the respective lyrics information from the said first and said second lyrics memories, said method comprising the steps of:

calculating the remaining performance time by comparing the total performance time with the elapsed time of the currently performed song;

obtaining the title and corresponding lyrics information representing a first measure of the reserved song responsive to a reserved song number, when said remaining performance time is less than a predetermined value; and displaying the title and the lyrics information for the first measure of the reserved song superimposed on a background image associated with a respective currently performed song.

3. A video-song accompaniment apparatus which reproduces lyrics information and accompaniment information, comprising:

a reproducing portion which reproduces lyrics information and accompaniment information from a recording medium;

a first lyrics memory storing first lyrics information read out from said reproducing portion of a first song that is going to be performed;

a second lyrics memory storing a title and second lyrics information read out by said reproducing portion, representing a first measure of a second song which is to be performed next;

an accompaniment information memory storing the accompaniment information read out from said reproducing portion of the song being performed;

a lyrics signal generator receiving the respective lyrics information read out from said first and second lyrics memories and generating a video signal corresponding to the respective lyrics information;

an accompaniment signal generator receiving the accompaniment information read out from said accompaniment information memory and generating an audio signal corresponding to the accompaniment information;

a remaining performance time operating portion calculating total performance time, elapsed performance time, and remaining performance time, with reference to the quantity of the accompaniment information stored in said accompaniment information memory and the quantity of the accompaniment information previously supplied to said accompaniment signal generator; and a controller which reads out the lyrics information stored in said first lyrics memory and provides the lyrics information to said lyrics signal generator and, when said remaining performance time is less than a predetermined value, reads out the title and respective second lyrics information of the second song stored in said second memory and provides the title and second lyrics information to said lyrics signal generator.

4. The video-song accompaniment apparatus as claimed in claim 3, wherein said recording medium is a compact disk.

5. The video-song accompaniment apparatus as claimed in claim 3, wherein said accompaniment information is stored in said recording medium according to a musical instrument digital interface (MIDI) format.

* * * * *